Inventor
Jacques R Donnay
By Ralph B. Stewart
attorney

Inventor
Jacques R. Donnay
By Ralph B. Stewart
attorney

Nov. 3, 1959 J. R. DONNAY 2,911,467

VIDEO MIXER FOR TELEVISION TRANSMISSIONS

Filed Feb. 15, 1954 4 Sheets-Sheet 3

Inventor
Jacques R. Donnay
By Ralph B. Stewart

Nov. 3, 1959 J. R. DONNAY 2,911,467

VIDEO MIXER FOR TELEVISION TRANSMISSIONS

Filed Feb. 15, 1954 4 Sheets-Sheet 4

Inventor
Jacques R. Donnay
By Ralph B. Stewart
Attorney

United States Patent Office 2,911,467

Patented Nov. 3, 1959

2,911,467

VIDEO MIXER FOR TELEVISION TRANSMISSIONS

Jacques Rene Donnay, Paris, France, assignor to Societe Nouvelle de L'Outillage R.B.V. et de la Radio-Industrie S.A., Paris, France Application February 15, 1954, Serial No. 410,170

Claims priority, application France February 16, 1953

9 Claims. (Cl. 178—7.1)

The invention is concerned with television video mixer. As is well known, in ordinary broadcast, it is usual to use several pick-up units feeding different video signal channels which are all sent to a video mixer and switching center where the most suitable picture is selected among the different pictures corresponding to the several channels and sent to be radiated by the transmitter.

This invention is concerned with a system for the quick switching from one video pick-up channel to another and also for the slow switching or fading out of the signal from one pick-up channel simultaneously with the building-up of the signal from another pick-up channel.

The switching from one of the video signals to another should be either very quickly or by a smooth variation so as to provide a slow vanishing of one of the pictures with a slow building up of the other. It is usual that the switching operator be provided with two sets of controls each of which corresponds to each of the pick-up channels. Channels interconnected by operation of said control act either directly in case of quick switching or by the intermediate of time constant networks in case of slow fading. The use of such time constant networks which are to be incorporated into the channel at times and which should not be present under other operating conditions leads to a very intricate mechanical control device in the video mixer. It is an object of the invention to provide an all-electronic video mixer incorporating only two sets of ordinary push-buttons as a controlling device.

The switching from one video channel to another when it is quick, is usually performed in a time short with respect to 1/30 second so that the televiewer should not be affected by such a change. During the switching operation, it is current practice to cut-off both video signals so as to prevent any reaction from one of the channels on the other. Therefore, the picture screen shows a few unmodulated lines. Though the phenomenon is very short, white or black streaks are shown on the screen which are disagreeable to the viewer. On the other hand, it is not possible to prevent switching occuring in the middle of a field. The impression of an unfinished picture of which another takes the place produces an unpleasant impression. It is therefore another object of the invention to provide a video switching system in which switching is automatically performed during the vertical blanking pulse which follows immediately the manual control.

Another difficult problem which has to be dealt with in the design of the video mixer is in providing a fool proof condition, that is to say making it impossible to switch on simultaneously two video channels on the output cable feeding the transmitter except when slow fading is required. This condition leads to intricate mechanical safeguards especially when two sets of controls are provided as is necessary if slow fading and building up of the pictures are to be obtained. It is therefore another object of the invention to provide a video switching system comprising automatic electronic resetting means so as to make it impossible to switch on one video channel when another one is being fed to the output circuit.

A video mixer is described for instance in Television Broadcasting, by H. A. Chins (McGraw-Hill 1953 1st edition) pages 82–83 and 486. As shown on the first reference cited, a time constant circuit is placed in the bias supply which is switched on or off from a video amplifier in each channel. In more elaborate equipment, it is possible to remove such circuits if instantaneous operation is required. However, only limited fading out effect may be obtained and the possibility of trick effects is reduced. It is another object of the invention to provide a video mixer in which slow fading of one picture may be manually controlled to any desired value.

According to the invention, switching is performed by means of a coincidence network comprising a D.C. control network, hand operated by means of the push-button manual control, and a group of bistable electronic switches, pulse operated, said switches being only sensitive to said triggering pulses when the D.C. conditions allow for it, said pulses being derived from vertical synchronisation signals.

According to another feature of the invention, all the electronic switches are reset automatically by means of a second group of control pulses synchronised with and delayed with respect to the field synchronising pulses, except for the switch, the D.C. operating conditions of which have been modified by manual control.

According to still another feature of the invention, the output video channel from said video mixer is associated with a clamping device controlled by means of pulses, the duration of which is phased with and longer than said triggering and/or resetting pulses.

According to another feature of the invention, an impedance adaptor is provided between each of the controlled video amplifier and the output network.

The invention will be better understood by reference to the following description of the invention with the accompanying drawings.

Figure 1 gives diagram of the video mixer.

So as to simplify the description, it is assumed that the video mixer shown operates with three different video pick-up channels, the pentode type output amplifiers of which are shown at 1, 2 and 3 respectively. The selected video signal feeds an output channel shown as cable 4. Each video channel is associated with an electronic switch shown at 5, 6 and 7 respectively which are fed in parallel with negatively polarised triggering pulses A. According to a main characteristic, of the invention, controlling pulses A occur during the vertical blanking period. Controlling pulses A, may be for instance the first field synchronising pulse or as will be explained later on, pulses A are obtained from said vertical synchronising pulses as delivered directly by the master synchronising equipment feeding the transmitter. The manual control operates a series of mechanical switches shown as $I_1$, $I_2$, $I_3$ connected to the electronic switches by means of D.C. transmitting circuits shown as resistor condenser $R'_1$, $C_1$, $R_1$ networks. The D.C operating conditions are such that if one of the mechanical switches, $I_1$ for instance, is closed, the following pulse A will trigger the associated electronic switch 5. When mechanical switches are opened, the D.C. conditions are such that triggering pulses A remain without effect.

Mechanical switches I are embodied in a push-button controlling device on the desk of the switching operator. As is well know, when one of the buttons is pushed down, the other one comes up automatically.

Figure 1:
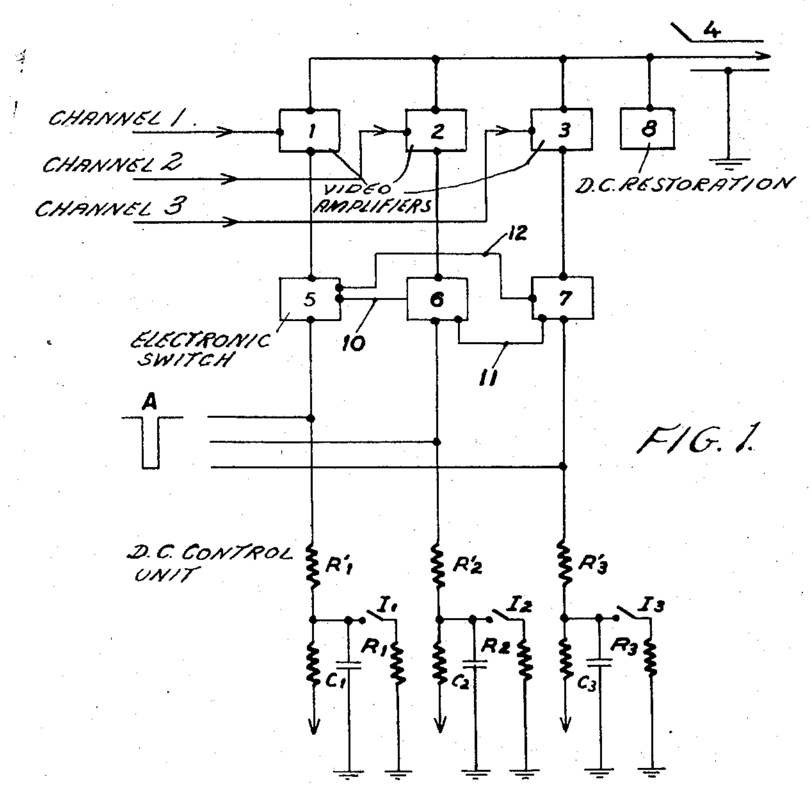

Figure 1 shows mechanical switches I directly connected to electronic switches 5, 6, 7. This is not usually the case since the switching desk with switches I is often in a room different from the video mixer. Since only D.C. voltages have to be transmitted, from the desk to the electronic switch, any telecontrol system will easily work. Such a system is described in the French Patent No. 1,048,731 (assigned to the same assignee as the present application).

As shown on Figure 1, the switching on of one of the mechanical switches will connect discharge resistor $R_1$, $R_2$, and so on, across the corresponding condenser $C_1$, $C_2$ and so on. Said condensers are charged at the voltage of a bias supply. The condenser will discharge through the connected resistor and therefore lower the potential at the upper end of resistor $R'_1$, $R'_2$ and so on. The time constant of the discharge network of condenser C is chosen with respect to the field scanning duration and the D.C. operating voltage of electronic switches 5, 6, 7 so that the next pulse A will switch on the corresponding electronic switch. As shown by conductors 10, 11, 12, each of the electronic switches is connected to all the others so that said others should be reset (switched off) when said one switch is switched on. The complete D.C. control network is shown on Figure 2 in which the electronic switches 5, 6, 7 are shown as two stage bistable networks. The corresponding parts in the three channels bear the same reference number with different primes. It is assumed that mechanical switch $I_3$ is closed and that control pulse A has switched on electronic switch 7. Therefore, video channel 3 is sent through cable 4. When the mechanical switch is opened, the left stage of the bistable network is nonconductive as shown by 0 and the right one is conductive as shown by 1. When the switch is closed, the working of the two stages is reversed. Said electronic switches are of the Eccles-Jordan type of multivibrator. Controlling pulses A are fed simultaneously to the three electronic switches so as to cut-off the corresponding unidirectional device $D_1$, $D'_1$, $D''_1$ which are normally conductive, D.C. current flowing from point P towards conductor 9. Point P is connected to a negative voltage source by means of resistors R, R', R''. Resistors R are shunted by the low direct resistances of the two unidirectional devices $D_1$ and $D_2$, both of which are normally conductive. When $D_1$ is cut-off, the potential at point P lowers that is, the negative potential is increased. However, this decrease of potential is not sufficient to make the associated unidirectional device $D_3$ conductive. Closing of mechanical switch $I_3$ has the effect of connecting directly unidirectional device $D''_2$ to the negative bias voltage, which has the effect of cutting off this device. Therefore, the potential of point P'' is lowered because of the high inverse resistance of $D''_2$. In these conditions, the supplementary decrease in the potential of P'' due to the next impulse A is sufficient to make corresponding unidirectional device $D''_3$ conductive. Therefore, the potential of point S'' is lowered and controls electronic switch 7. When the electronic switch 7 has been switched on, the right stage becomes nonconductive and a positive pulse appears in the anodic circuit of said stage. Said positive pulse is transmitted by means of unidirectional device 13'', lead 14'' and unidirectional devices 15 and 15' to both switches 5 and 6 so as to switch them off as shown on the figure. As will be easily understood, each switch controls both the two other switches so that only one of them may be in the electrical state corresponding to the switching on of the associated video channel.

Both the D.C. controlling network and the interconnecting network between the electronic switches, which has just been described, are, by preference, made of semiconductive unidirectional devices which are of small volume and do not require any heating energy. However, the interconnecting network may become rather intricate if the video mixer works with many video channels. As was explained, the main purpose of said interconnecting network is to provide for automatic switching off of all but one of the electronic switches.

Figure 3:
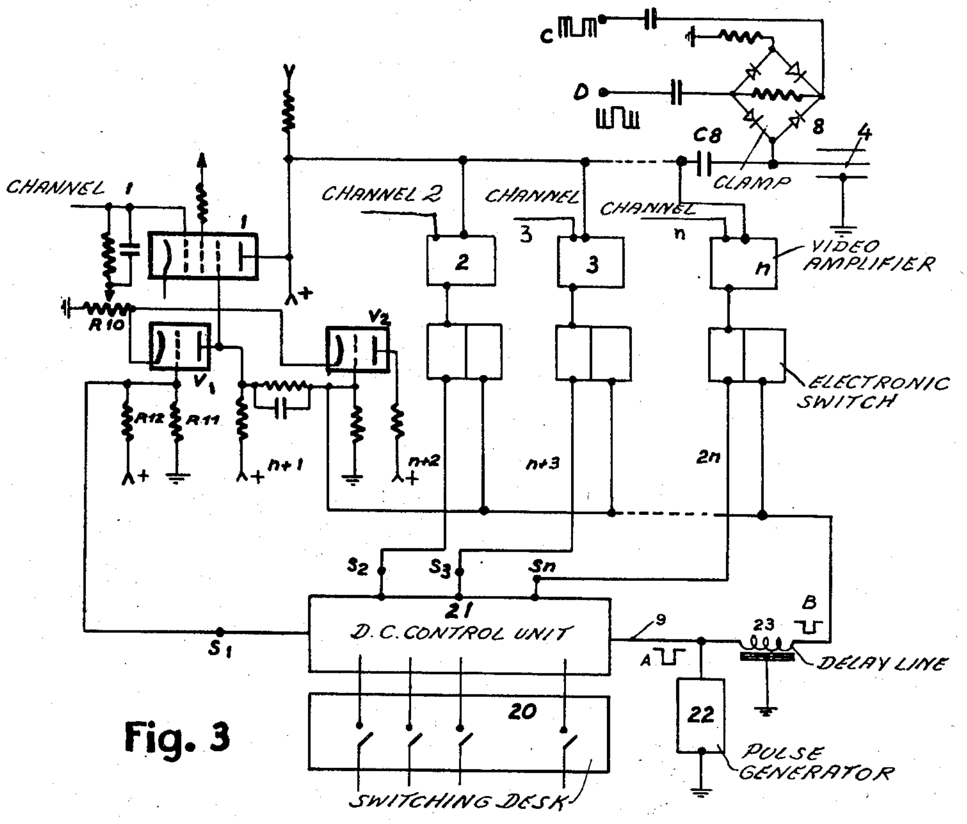
Figure 3 shows the pulse controlled automatic resetting of the electronic switches.

Figure 3 shows an all electronic device which provides for automatic resetting of all the switches but one, at field frequency, without the use of any interconnecting circuit. The video mixer shown on Figure 3 is intended to work with *n* video channels, the pentode type output amplifiers of which are shown as 1, 2, 3 . . . *n*. The corresponding electronic switches are shown as $n+1$, $n+2$, $n+3$ . . . $2n$, switch $n+1$ being shown in full details. The control desk of the switching operator is shown as 20 and connected by means of D.C. transmission channel to the D.C. controlling unit 21. A preferred embodiment of unit 21 is shown on Figure 4.

Triggering pulses A are delivered by generator 22 which, as will be explained later with reference to Figure 5, consists in an integrating network fed by the master synchronising equipment. Triggering pulses A are sent through the D.C. controlling unit 21 as was explained by reference to Figure 2, and as shown on Figure 4. On the other hand, pulses A feed a delay line 23, the delay of which is at least equal to the duration of pulses A, as appears on the curves A and B of Figure 5. As will be seen, both impulses A and B occur during the vertical blanking period, shown as S on curve V which represents the United States type of television signals.

Electronic switches $n+1$, $n+2$ . . . $2n$ are of the Schmidt trigger type, $V_1$ stage being normally conductive owing to the positive grid bias applied through $R_{12}/R_{11}$. Stage $V_2$ is normally cut-off. Closing one of the control push-buttons on switching desk 20 will, as explained with reference to Figure 4, decrease the potential at point S of the corresponding channel. The decrease in potential is not sufficient to cut $V_1$ off. The next triggering pulses A will switch $V_1$ off and switch $V_2$ on. The D.C. anode potential increase of stage $V_1$ is transmitted to the connected suppressor grid of the corresponding video amplifier. This voltage increase is sufficient to make said video amplifier conductive. The Schmidt trigger will remain on until another external action takes place. Resetting pulses B are applied to the control grid of stage $V_2$ of the triggers to switch off or lock out all switches except the one selected by the switching operator. When stages $V_2$ are inoperative, negative pulses B do not change the working conditions. However, if one of the Schmidt triggers has been switched on, the corresponding $V_2$ stage is conductive and pulse B will tend to cut-off said stage and switch off the trigger. The switching off is possible only if the D.C. operating voltages on the trigger correspond to the normal conditions. When a negative D.C. potential is applied to stage $V_1$ of the trigger under the control of desk 20, the resetting of the switch by pulse B is made impossible. As appears, all the electronic switches but one are automatically switched off during each field retrace period. As usual, the video signal is applied to the output circuit shown as cable 4, by means of coupling condenser $C_8$ and D.C. restoring circuit 8, shown as a bidirectional clamp known per se. The clamping pulses C and D are shown on curve C—D. As shown, clamping pulses comprise horizontal clamping pulses E occuring, as usual, during the back porch of the horizontal synchronising signal, added to a long vertical blanking pulse F, the duration of which is longer than the length of time between the leading edge of pulse A and the lagging edge of pulse B, and shorter than vertical blanking pulse S. It is necessary to provide such clamping pulses so as to compensate for the spurious signals which may be sent through the line during the switching operation. It is preferred to use a vertical clamping pulse which is shorter than the vertical blanking pulse since it allows to use a rather narrow pass-band clamping circuit.

As was said, pulses A are delivered by an integrating circuit fed with the vertical synchronising signal (I curve V) from the master synchronising equipment. Duration of pulses A is almost three line periods. Delay of line 23 is about four line periods. Vertical clamping pulses F (curve C—D) are delivered by a monostable multivibrator (flip-flop circuit) which is controlled by the leading edge of the vertical blanking signal (S) through a narrow frequency band network which causes a delay in the triggering of said flip-flop circuit. Said delay is shorter than the three line periods occupied by the equalizing pulses at the beginning of each vertical blanking signal. The duration of pulse F is such that the lagging edge of pulse F occurs after the end of pulse B, and before the end of the vertical line blanking. In a particular equipment the value of 18 lines was chosen.

It is preferred to use an independent generator for pulses F. However the vertical blanking pulse as given by the master synchronising generator may be used. In this case, it is necessary to design a wide band clamping network to avoid any lag.

Figure 2:
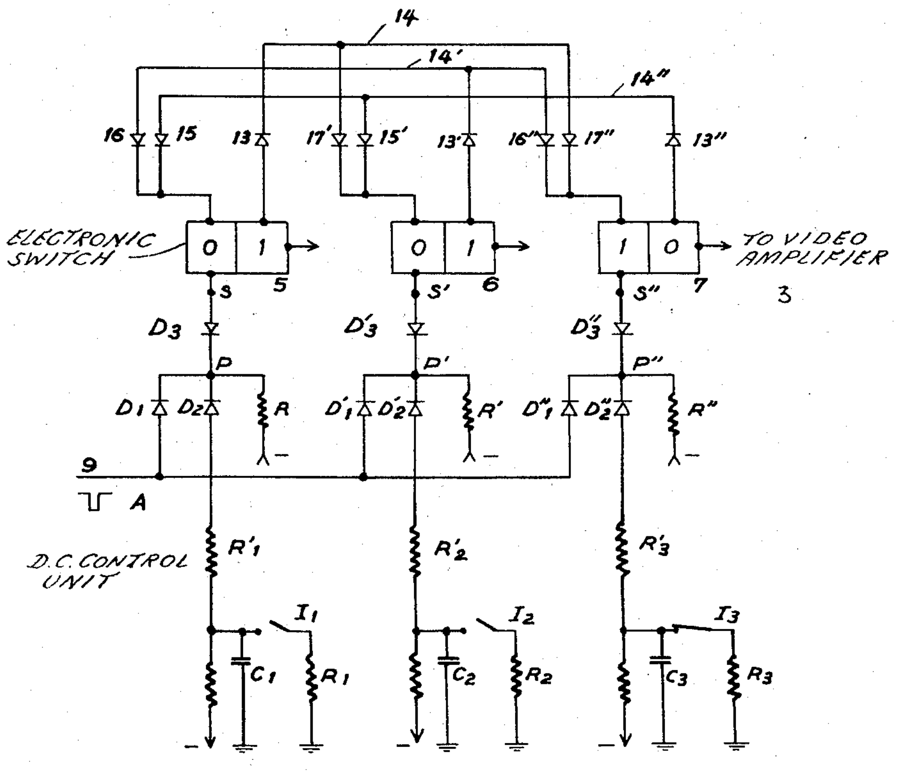
Figure 2 shows a first embodiment of the D.C. controlling network and interconnecting network between the electronic switches.
Figure 4:
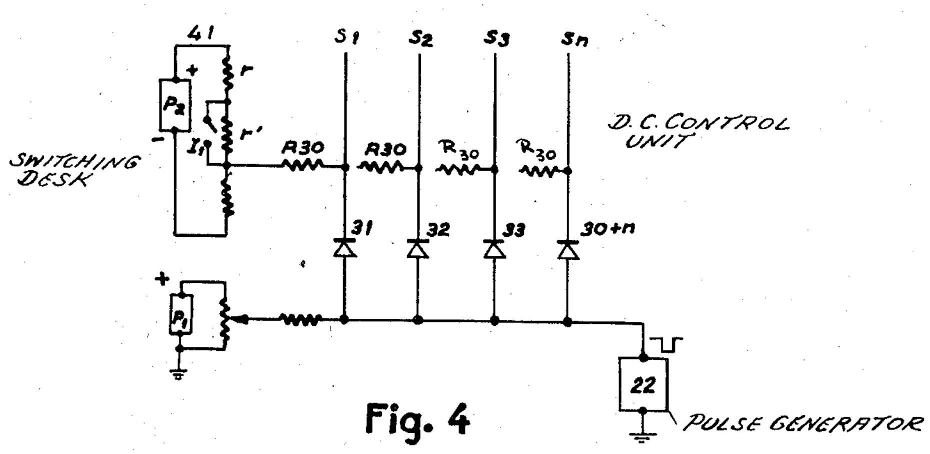
Figure 4 shows another embodiment of said D.C. control circuit.

Figure 4 shows an embodiment of a D.C. controlling unit slightly different from the circuits shown on Figure 2, designed to operate with the electronic switches of Figure 3. Only one of the mechanical switches $I_1$ is shown with its circuit 41. Identical circuits are connected at the end of each resistor $R_{30}$. The operation of push-button on desk 20 closes the corresponding mechanical switch $I_1$ with the result of the decreasing the D.C. potential at the corresponding points S by short circuiting resistor $r'$ in series with biassing voltage source $P_2$. Unidirectional devices 31, 32, 33, 30+$n$ are normally non conductive owing to the biassing voltage due to source $P_1$. When one of the mechanical switches I is closed, the corresponding unidirectional device becomes conductive and the following negative triggering pulse A is transmitted at corresponding point S. Added to the decrease of D.C. potential, said negative pulse switches on the corresponding Schmidt trigger.

Figure 5:
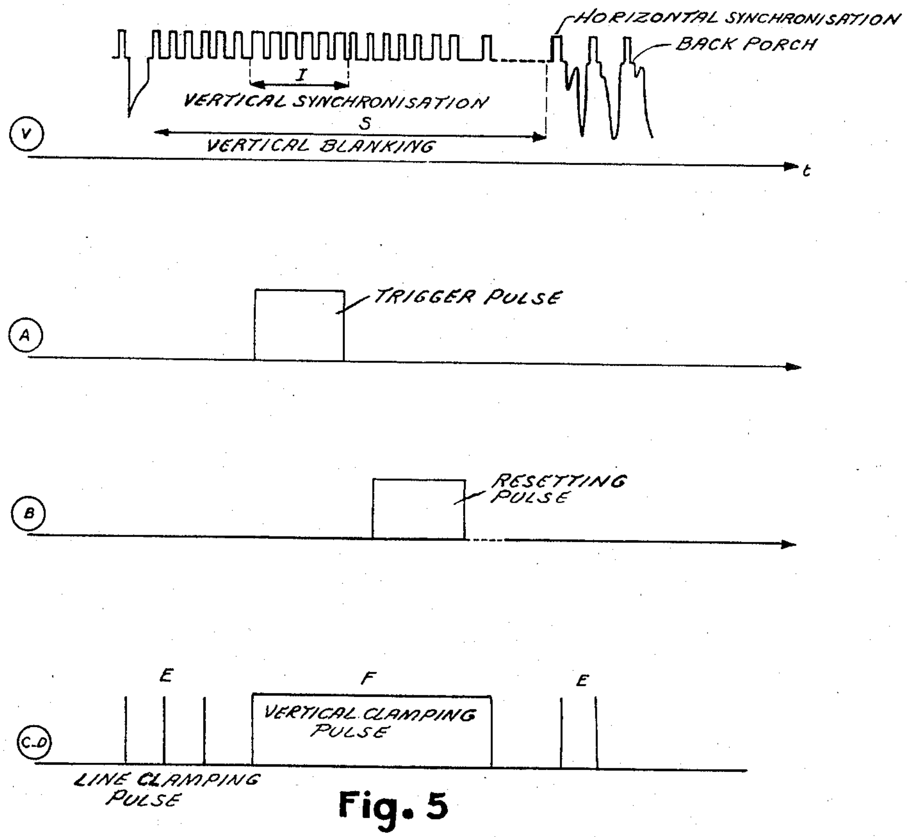
Figure 5 shows the time relation between the different pulses controlling the operation of the video mixer of Figure 3.
Figure 6:
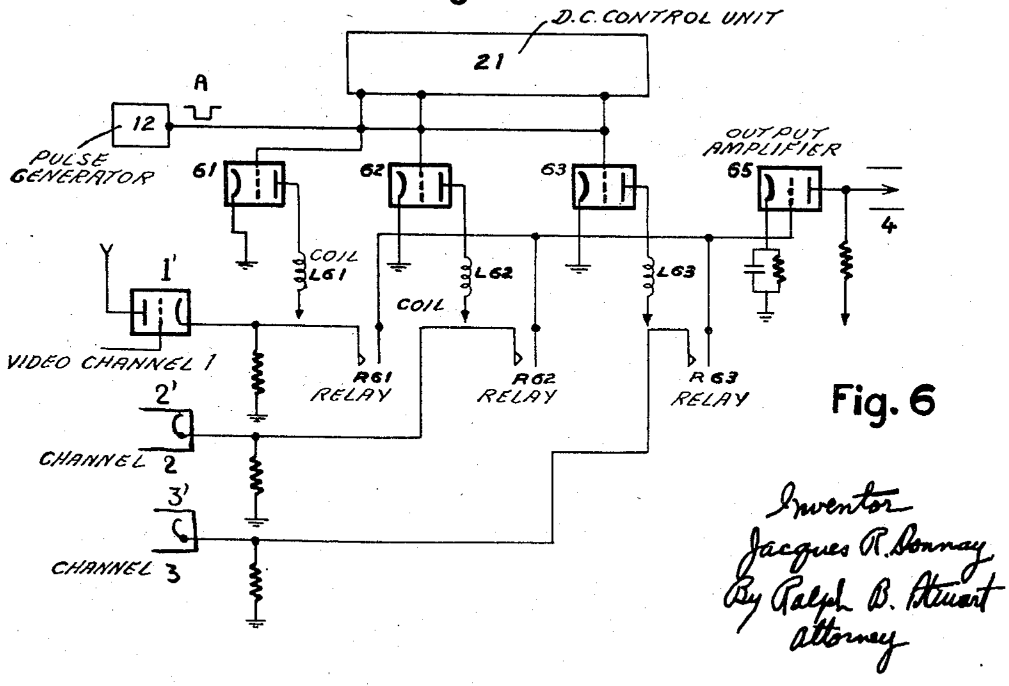
Figure 6 shows another embodiment of the invention provided with an impedance matching network between the switching circuit and the video channels.

Figure 6 shows another embodiment of the video mixer which may be operated without vertical clamping pulses such as F of curve C—D, Figure 5. Switching on of one of the electronic switches of the circuits already shown controls the conductivity of the corresponding video amplifier by means of a high impedance connection (suppressor grid circuit). It is therefore practically not possible to use a low pass filter on such a connecting circuit to remove the spurious signals which accompany the switching on of the electronic switch. Said spurious signals will be transmitted in the output video channel where no such filter may be used without impairing the quality of the video signal. That is why said video channel is to be clamped by means of long vertical clamping signal during the switching operation. According to the feature of the invention shown on the circuit of Figure 6, impedance matching means are provided between the switching unit and the transmission channel or video channel so that the control is operated by means of low impedance circuits which avoid any transient spurious signal being introduced in the transmission channel. As shown, the terminal stage of each video channel is a low impedance cathode follower 1', 2', 3' of the type used in the previous circuits to drive the pentode type amplifiers 1, 2, 3. The output resistors of said stages are matched with the impedance of electro-mechanical relays $R_{61}$, $R_{62}$, $R_{63}$ feeding in parallel an output stage 65 coupled to cable 4. Electronic switches 61, 62, 63 are of the triode type. They are switched on by the D.C. potential control transmitted by the D.C. controlling unit 21 and the triggering pulses A as explained before. Both the D.C. and pulse controlling voltages are positively polarised. The D.C. controlling potential due to the operation of the mechanical switch on the switching desk is such as to make the triode stage conductive. The low anodic current which flows through the load coils $L_{61}$, $L_{62}$, $L_{63}$ operating the relays is not sufficient to switch them on. During the next positive triggering pulse A the anode current of the controlled triode becomes sufficient to close the relay and the low anodic current which is maintained owing to the D.C. controlling potential is enough to keep it closed. The coil is sufficient to filter any transient spurious signal out from the transmission channnel. When the positive D.C. potential due to the switching desk control is removed from one of the triode stages to another, the next triggering pulse A is inoperative on the first triode stage and closes the relay connected with said second triode stage. The corresponding video signal is then transmitted through cable 4.

Figure 7:
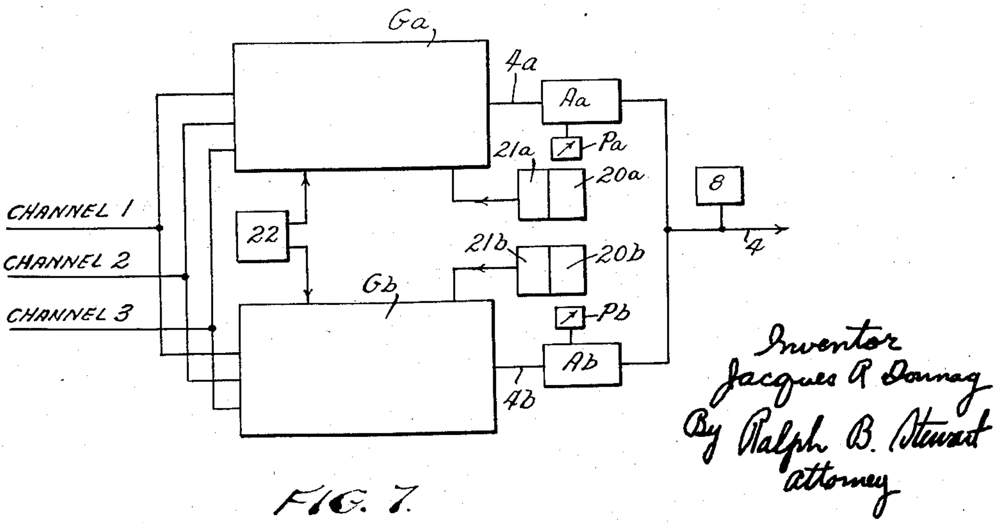
Figure 7 is a block diagram of a double-switching system for slow switching or fading.

When slow fading is required as was mentioned above, the arrangement of Figure 7 is used, embodying a double switching panel 20$a$ and 20$b$ incorporating two sets of channel controlling buttons as already described. Said double switching panel is connected to two independent D.C. control units 21$a$ and 21$b$ like control unit 21 already described, for controlling two groups of electronic switches $(n+1)$ . . . 2$n$, connected to two independent groups of video amplifiers 1, 2 . . . $n$, directly or by means of impedance matching network such as shown on Figure 6. The two groups of switches and amplifiers are represented in Figure 7 by the rectangles G$a$ and G$b$. Each video channel includes two amplifiers such as 1, 2 . . . $n$ connected in parallel. The amplifiers 1, 2 . . . $n$ of the first group G$a$ are connected to a first common load or output line such as shown at 4$a$ and the amplifiers of the second group G$b$ are connected to a second output line 4$b$. Both output signals are amplified in gain controllable amplifier A$a$ and A$b$. The gain controls are potentiometers P$a$ and P$b$ at the switching desk. Both gain controlled amplifiers feed the same load or output line 4 and the D.C. restoration is applied to the common output line at 8.

What I claim is:

1. A switching system for a television transmission system provided with at least three pick-up channels and an output channel, said television transmission system including means for generating frame blanking pulses to provide frame blanking periods, an electrically-operated bi-stable channel switch for each pick-up channel comprising means for effecting connection of the pick-up channel to the output channel, manual control means for selecting and conditioning a desired one of said switches to the exclusion of all others, a source of control pulses occurring during the frame blanking periods, said source being connected to all of said switches in parallel, means responsive to receipt of a control pulse to effect operation of the selected switch, and lock-out means rendered effective after the operation of the selected switch and during the same blanking period for opening all other channel switches.

2. A switching system according to claim 1, wherein each channel switch comprises a two-stage flip-flop circuit.

3. A switching system according to claim 1, wherein each channel switch is provided with a re-setting circuit, and said lock-out means includes delay means energized by said control pulse for supplying a delayed energizing pulse to the re-setting circuits of said channel switches, said manual control means preventing the re-setting of said selected switch.

4. A switching system according to claim 1, wherein each channel switch is provided with a re-setting circuit, and said lock-out means comprises means controlled by each channel switch, upon operation thereof by a control pulse, for energizing the re-setting circuits of the remaining switches.

5. A switching system according to claim 1, and including direct current restoring means for applying to said output channel, a clamping pulse of a duration extending over the time interval required for the operation of a selected channel switch and for locking out the other channel switches.

6. A switching system for a television transmission system provided with at least three pick-up channels and an output channel, said television transmission system including means for generating frame blanking pulses to provide frame blanking periods, a pentode amplifier connecting each pick-up channel with said output channel, biasing means normally applying a potential to the suppressor grid of each pentode amplifier to render said amplifiers inoperative, an electrically-operated channel switch for each pick-up channel connected to control the biasing potential applied to the pentode amplifier of the associated pick-up channel, manual control means for selecting and conditioning a desired one of said switches, a source of control pulses occurring during the frame blanking periods, and means responsive to receipt of a control pulse to effect operation of the selected channel switch, whereby one of said amplifiers is rendered operative.

7. In a television transmission system of the type including means for generating frame blanking pulses to provide frame blanking periods, means for mixing television signals received from at least three pick-up channels and supplying mixed signals to a common output channel comprising, in combination, a pair of variable-gain amplifiers having their output circuits connected to said common output channel; a first switching system connecting said pick-up channels to the input of one of said variable-gain amplifiers, a second switching system connecting said pick-up channels to the input of the second variable-gain amplifier; each of said switching systems comprising an electrically-operated channel switch for each pick-up channel including means for effecting connection of the pick-up channel to the input of the associated variable-gain amplifier, manual control means for selecting and conditioning a desired one of said switches in each switching system, a source of control pulse occurring during the frame blanking periods, and means responsive to receipt of a control pulse to effect operation of the selected switch.

8. A mixer system according to claim 7, wherein each of said first and second switching systems includes lock-out means rendered effective after the operation of the selected switch and during the same blanking period for opening all of the channel switches except the selected switch.

9. A mixer system according to claim 8, and including current restoring means for applying to said output channel a clamping pulse of a duration extending over the time interval required for the operation of the selected channel switch and for the operation of said lock-out means.

References Cited in the file of this patent

UNITED STATES PATENTS

| | | |
|---|---|---|
| 2,653,186 | Hurford | Sept. 22, 1953 |
| 2,679,554 | Hurford | May 25, 1954 |